United States Patent [19]

Yang

[11] Patent Number: 5,541,483
[45] Date of Patent: Jul. 30, 1996

[54] CONTROL SYSTEM AND METHOD FOR CONTROLLING A DC MOTOR OR GENERATOR

[76] Inventor: Tai-Her Yang, 5-1 Taipin St. Si-Hu Town, Dzan-Hwa, Taiwan

[21] Appl. No.: 87,415

[22] Filed: Jul. 8, 1993

[30] Foreign Application Priority Data

May 8, 1992 [GB] United Kingdom .................. 9216576

[51] Int. Cl.⁶ ..................................................... H02P 5/40
[52] U.S. Cl. ........................ 318/245; 318/139; 318/775; 318/254
[58] Field of Search ..................................... 318/139, 257, 318/245, 256, 254, 376, 599, 269, 140, 493, 729, 775, 777, 779, 778, 696, 776, 729; 388/803, 801, 802, 809, 810, 806; 307/40–70

[56] References Cited

U.S. PATENT DOCUMENTS

| | | | |
|---|---|---|---|
| 3,855,509 | 12/1974 | Wright | 318/227 |
| 3,944,900 | 3/1976 | Rohsler | 318/139 X |
| 3,947,738 | 3/1976 | Oliver | 318/399 |
| 4,052,647 | 10/1977 | Thompson | 318/139 |
| 4,138,629 | 2/1979 | Miller et al. | 318/140 |
| 4,240,015 | 12/1980 | White | 318/139 |
| 4,309,644 | 1/1982 | Reimers et al. | 318/139 |
| 4,423,362 | 12/1983 | Konrad et al. | 318/319 |
| 4,806,838 | 2/1989 | Weber | 318/729 |
| 4,823,067 | 4/1989 | Weber | 318/799 |
| 5,006,773 | 4/1991 | Goldberg | 318/696 |
| 5,039,924 | 8/1991 | Avitan | 318/139 |
| 5,070,283 | 12/1991 | Avitan | 318/139 |
| 5,077,512 | 12/1991 | Weber | 318/776 |
| 5,119,011 | 6/1992 | Lambert | 318/139 X |
| 5,159,255 | 10/1992 | Weber | 318/775 |
| 5,264,763 | 11/1993 | Avitan | 318/139 |

Primary Examiner—Paul Ip
Attorney, Agent, or Firm—Bacon & Thomas

[57] ABSTRACT

A control system for controlling the excitation of a DC motor or generator activates an auxiliary power source to increase the magnetic field intensity in one or more field windings of the motor or generator when the intensity falls below a desired level, especially during a low voltage mode of operation. The system includes an excitation control system which generates a feedback signal for controlling a subexciter circuit included in the auxiliary power source in response to signals generated from detection elements that monitor various operational conditions of the motor or generator.

10 Claims, 1 Drawing Sheet

CONTROL SYSTEM AND METHOD FOR CONTROLLING A DC MOTOR OR GENERATOR

SUMMARY OF THE INVENTION

The total efficiency of conventional series-type or compound-armature direct current commutating machines which use voltage doubling to provide all or a portion of the DC series-type excitation needed to energize one or more of its field windings tends to be low, especially during a low-speed/low-voltage mode of operation, because the voltage doubling technique causes periodic drops to occur in the excitation current being supplied to the field windings. These periodic drops, in turn, cause the magnetic field intensity in the field windings to fluctuate, which produces the shortcomings of, in the case of a motor, a variable speed armature and, in the case of a generator, an inconsistent DC output voltage.

The present invention overcomes the shortcomings by providing a control system and method for controlling the excitation of a direct current commutating machine under a voltage doubling operation so that the magnetic field intensity in at least one field windings of the machine does not fluctuate, in spite of the voltage doubling operation. These advantages are achieved by providing a control system which activates an auxiliary power source, which includes a sub-exciter circuit, to alter the DC series-type excitation into the field winding to thereby increase the magnetic field intensity in the field winding when the intensity drops as a result of voltage doubling during a low-voltage or light-load operation, as well as during full-load conditions when voltage doubling has not substantially degraded the magnetic field intensity, i.e., when a normal level of excitation resides in the field windings. The overall effect is thus to attain a magnetic field intensity of a constant or desired magnitude, i.e., saturated or nearly saturated excitation of the field windings, under either full-load or light-load conditions, thereby raising the efficiency of the dynamo.

Control of the sub-exciter is accomplished by an excitation control circuit which generates feedback signals in response to at least one operational status signal derived from at least one detection element, which monitors, for example, any one or more of the output voltage and current of main and auxiliary power supplies, the revolving speed of the motor, the load current into a DC series-type field winding, the electromotive force of the armature, and the voltage drop across the winding. In one specific embodiment, the sub-exciter circuit includes a current limiting element for performing charging adjustment of a storage element such as a battery.

The difference between the present invention and conventional control systems is that the former can increase the efficiency of the system while simultaneously preserving the features of a low starting current, a big torque, and good overloading torsion of the motor, during both low-voltage and full load modes of operation.

DETAILED DESCRIPTION OF THE INVENTION

Figure 1:
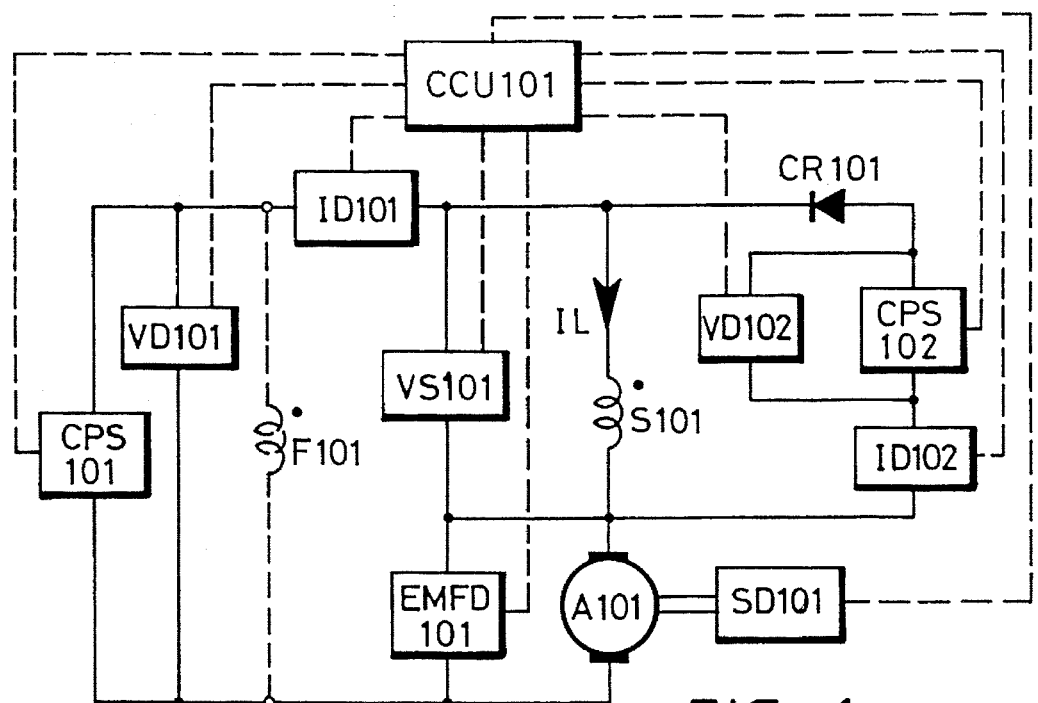
FIG. 1 is a circuit diagram of a first preferred embodiment of the control system of the present invention adapted to operate in conjunction with a DC series-type excitation or compound rectifier motor.

The control system and method of the present invention may be adapted to control the DC series-type excitation of a direct-current commutating machine, such as a DC motor, generator, or dynamo. The need for such control is especially important when the DC motor or generator uses a compound rectifier such as a voltage doubling circuit to supply the excitation current to one or more field windings, because the inconsistency of the output of the voltage doubling circuit, especially during low-voltage/low-load modes of operation, causes fluctuations to occur in the magnetic field intensity of the field windings. This in turn may prevent the motor from operating at a reliable and constant rotational speed or may prevent the output voltage of a generator from fluctuating. The overall effect, thus, is to substantially degrade the operational performance of the machine.

The control system and method compensates for the inconsistent output of the voltage doubling circuit by using an auxiliary power source to increase the overall excitation current into the field windings during those times when the output of the voltage doubling circuit drops, thereby ensuring that a constant magnetic field intensity is continuously maintained in the field windings.

In the context of DC motors per se, the control system and method of the present invention may advantageously be used to control, or more precisely maintain, the rotational speed (or torsion) of the motor in spite of fluctuations in load current into the field windings.

The manner in which such control is effectuated can be best understood with reference to the following relation: the rotational speed (torsion) of the motor is in proportion to the intensity of the magnetic field in the field windings, which, in turn, is proportional to the excitation current supplied to the windings. Thus, a magnetic field intensity (or excitation current) is required to be maintained at an appropriate level in order for rotational speed to remain constant. Analogously, in the context of a generator, the generating voltage is in proportion to the intensity of the magnetic field, which, in turn, is proportional to the excitation current into the field windings. Thus, the magnetic field intensity (or excitation current) must remain at a constant level for there to be a constant DC output voltage.

In order to achieve a magnetic field intensity in the field windings that is of a constant magnitude, the control system and method of the present invention adopts an innovative approach by using an auxiliary power source in the form of a sub-exciter circuit to supplement the series-type excitation being supplied to the field windings when a drop in the output of the voltage doubling circuit occurs. Most advantageously, the subexciter control circuit increases the magnetic field intensity in the field windings during these drops during either a low-voltage or light-load mode of operation, when such drops will have their most pronounced effect, or during a full-load mode of operation. Thus, the field windings will be saturated, or nearly saturated, with excitation under a full range of voltage conditions, thereby improving the overall efficiency of operation of the motor or generator.

Referring to FIG. 1, a first preferred embodiment of the control system of the present invention adapted to operate in conjunction with a compound series-type DC excitation motor includes a series-type excitation winding S101, an armature A101 to be connected in series with the winding, a parallel-type excitation magnetic field winding F101, a main power supply CPS101, an auxiliary power supply circuit, and an excitation control circuit CCU101.

The main power supply CPS101 provides the primary excitation current for driving the DC motor. Supply CPS101 may simply be a one of a variety of DC sources such as a storage power element, a DC generator, or a solar energy source, or may be an AC power source connected to a compound rectifier such as a voltage doubling circuit which transforms the output into a fixed voltage or adjustable voltage.

The auxiliary power supply circuit includes a sub-exciter power supply CPS102, connected in series to a blocking diode CR101 and in parallel to the series-type excitation winding S101. A purpose of subexciter power supply CPS102 is to provide auxiliary excitation current to the series-type excitation winding when the primary excitation current produced from a voltage doubling operation drops to below an acceptable or reference level, and thus alters the magnetic field intensity in the winding. The direction of the sub-exciter voltage is consistent with the polary of the voltage drop across the series-type winding. Like the main power supply, the sub-exciter power supply may be a storage power element, a DC generator, a solar energy source, or an AC source where output is rectified into a fixed voltage or adjustable voltage.

The excitation control circuit CCU101 generates a feedback signal to control the interface between the main power supply and the auxiliary power supply based on signals received from an array of detection elements which sample the status of operation of the motor. The feedback signal, which alternatively may be generated by manual control, switches on and off the blocking diode to allow auxiliary excitation current from the sub-exciter to be added to the primary current from the main power supply CPS101, to thereby increase the overall excitation current into the series-type excitation winding S101 when the primary excitation current drops because of voltage doubling. The array of detection elements includes: a main power supply voltage detection element VD101 for monitoring the voltage across CPS101; a load current detection element ID101 for monitoring the primary excitation current emanating from the main power supply; an auxiliary power supply voltage element VD102 for monitoring the voltage drop across CPS102; an auxiliary power supply output current detection element ID102 for monitoring the auxiliary excitation current emanating from the subexciter; a detection element VS101 for monitoring the voltage drops across the field winding, as a means of measuring magnetic field intensity; an element EMFD101 for monitoring the electromotive force of the armature, and an element SD101 for monitoring the rotational speed of the motor.

The control system and method of the present invention is based on the principle that the voltage drop at the two ends of the series-type excitation winding S101 will increase as the load current (IL), i.e., the primary excitation current, increases, that the voltage drop is reverse to the voltage of the sub-exciter, and that the bigger the load current, the smaller the current of the sub-exciter, and the smaller the load current, the bigger the current of the sub-exciter. Thus, when the load current drops as a result of voltage doubling operation, the subexciter circuit may be increased to make up the difference, and thus readjust the magnetic field intensity in the winding to the desired level. The excitation control circuit is responsible for making this readjustment: decreases in load current are detected as a corresponding change in the status of operation of the motor by the detection element array. The detection elements, at this time, send signals to the excitation control system, which then activates the blocking diode to permit the sub-exciter to submit an auxiliary excitation current to be added to the now-reduced primary excitation current to maintain the desired level of magnetic field intensity in the winding.

Figure 2:
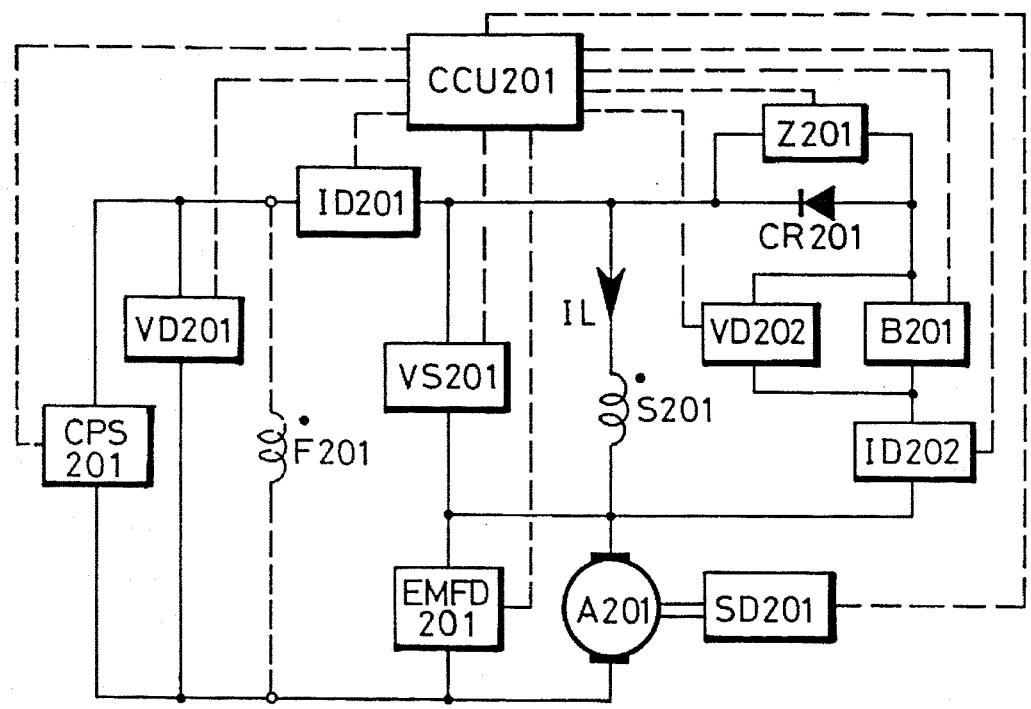
FIG. 2 is a circuit diagram of a second preferred embodiment of the control system of the present invention adapted to operate in conjunction with a DC series-type excitation or compound rectifier motor equipped with an auxiliary battery or other storage component to be used as an auxiliary power supply.

Referring to FIG. 2, a second preferred embodiment of the control system of the present invention includes an auxiliary storage battery or other storage element, in addition to the elements included in the first preferred embodiment shown in FIG. 1. The control system representing the second preferred embodiment adapted to operate in connection with a DC series-type motor, to be connected in series with a compound DC series-type excitation winding S201 and armature A201 and to be connected in parallel with a magnetic field winding F201, includes a main power supply CPS201, an auxiliary power supply circuit, and an auxiliary control circuit CCU201.

Main power supply CPS201 may be a DC power supply, a DC generator, a solar energy source, or an AC source connected to a rectifier for transforming the output of the AC source into a fixed voltage or adjustable voltage.

The auxiliary power supply includes a sub-exciter storage battery B201, connected in series with a blocking diode CR201 and in parallel with the series type excitation winding S201, for adding auxiliary excitation current to the series-type excitation magnetic field winding. The direction of the voltage of the sub-exciter is arranged in the same polarity with the voltage drop across the series-type magnetic field winding, in either a generator or motor application.

The auxiliary power supply also includes a current limiting adjusting element Z201, which may be an electromechanical or solid-state voltage regulation circuit or alternatively a blocking resistor, for charging the storage battery in reverse direction when the value of the voltage drop across the series-type excitation field winding S201 exceeds that of the voltage of the auxiliary storage battery B201.

The excitation control circuit CCU201 generates a feedback signal to control the interface between the main power supply and the auxiliary power supply based on signals generated from an array of detection elements which sample the status of operation of the motor. The feedback signal, which alternatively may be generated by manual control, controls the blocking diode to, in turn, control the ratio between the excitation current supplied from the main power supply CPS201 and the excitation current supplied from sub-exciter storage battery B201, both of which are added together to form the total excitation current into the series type excitation winding S201.

The array of detection elements includes: a main power supply detection element VD201 for monitoring the voltage across CPS201; a load current detection element ID201 for monitoring the primary excitation current emanating from the main power supply; an element EMFD201 for monitoring the electromotive force of the armature; an element VS201 for monitoring the voltage drop across the field winding; an element ID202 for monitoring the auxiliary excitation current emanating from the auxiliary storage battery; an element VS202 for monitoring the voltage drop across B201; and an element SD201 for monitoring the rotational speed of the motor.

The current limiting adjusting element Z201 controls, or more specifically recharges, B201 in accordance with the feedback signal generated by the excitation control circuit CCU101 when the voltage drop value across the series-type excitation winding is bigger than that of the voltage of the sub-exciter storage battery.

The manner of operation of the control system and method of the present invention is analogous to the manner of operation of the control system and method of the first embodiment. One difference, however, is that the current limiting element will operate to continuously recharge battery B201 so that its voltage is at least the same as the voltage across the field winding.

A summary of the functions of the control system and method for both embodiments is as follows:

For a motor having a series-type excitation winding, sub-exciter control of the series-type excitation winding is performed to increase the excitation current into the winding when the magnetic field intensity in the winding becomes reduced as a result of a drop in the primary excitation current caused by voltage doubling. Otherwise, subexciter control of the series-type magnetic field winding is not performed at all, or is significantly reduced, because the excitation current provided by the main power supply is adequate to create the desired magnetic field intensity in the series-type winding.

The overall effect of the sub-exciter control is to obtain a magnetic field with constant or appropriate intensity, and to thereby raise the total efficiency of the motor under voltage doubling conditions, especially during a low-voltage/low-load mode of operation.

An advantage of the present invention over conventional systems is that the former is able to provide separate control of the excitation being supplied to the motor. This separate control enables the motor to achieve a low starting current, a larger torque, and a good overloading torsion, and ultimately to offset any reduction in efficiency due to insufficient excitation of the magnetic field winding. Once again, the design is applicable to both DC motors and generators.

I claim:

1. A control system for providing DC series-type excitation to a direct current commutating machine, said machine including a rotating armature and at least one field winding connected in series with said armature, comprising:

a first means for supplying the field winding with a primary excitation current;

a second means, connected in parallel to said first means, for providing an auxiliary excitation current of a controlled magnitude; and a control means for allowing the auxiliary excitation current to enter the field winding when a magnetic field intensity measurement of the field winding deviates from a value corresponding to a desired magnetic field intensity, said auxiliary excitation current being combined with said primary excitation current to increase the magnetic field intensity measurement in the field winding to the desired magnetic field intensity, wherein said second means includes a subexciter circuit means containing an auxiliary power source to control an output of said auxiliary power source.

2. The control system as recited in claim 1, further comprising:

at least one detection element for monitoring at least one operational condition of said machine, said element providing said control means with a signal from which said magnetic field intensity measurement is derived, said control means issuing a feedback signal based on said magnetic field intensity measurement for allowing the auxiliary excitation current to enter the winding.

3. The control system as recited in claim 2, wherein said operational condition is a voltage drop measured across the field winding.

4. The control system as recited in claim 2, wherein said operational condition is a rotational speed of the armature.

5. The control system as recited in claim 2, wherein said operational condition is an electromotive force of said armature.

6. The control system as recited in claim 1, wherein said first means includes an AC power source connected in series with a compound rectifier circuit for transforming an output of the AC power source into a DC excitation current.

7. The control system as recited in claim 6, wherein said compound rectifier is a voltage doubling circuit.

8. The control system as recited in claim 1, wherein said auxiliary power source is a battery and said subexciter circuit means further contains a current limiting element for recharging said battery when a voltage measurement across the battery drops below a voltage drop measurement across the field winding.

9. The control system as recited in claim 1, wherein the direct current commutating machine is a DC motor.

10. A control system as recited in claim 1 wherein the direct current commutating machine is a DC generator.

* * * * *